H. E. WIREBAUGH.
SPRING WHEEL.
APPLICATION FILED OCT. 24, 1910.
1,016,534.
Patented Feb. 6, 1912.
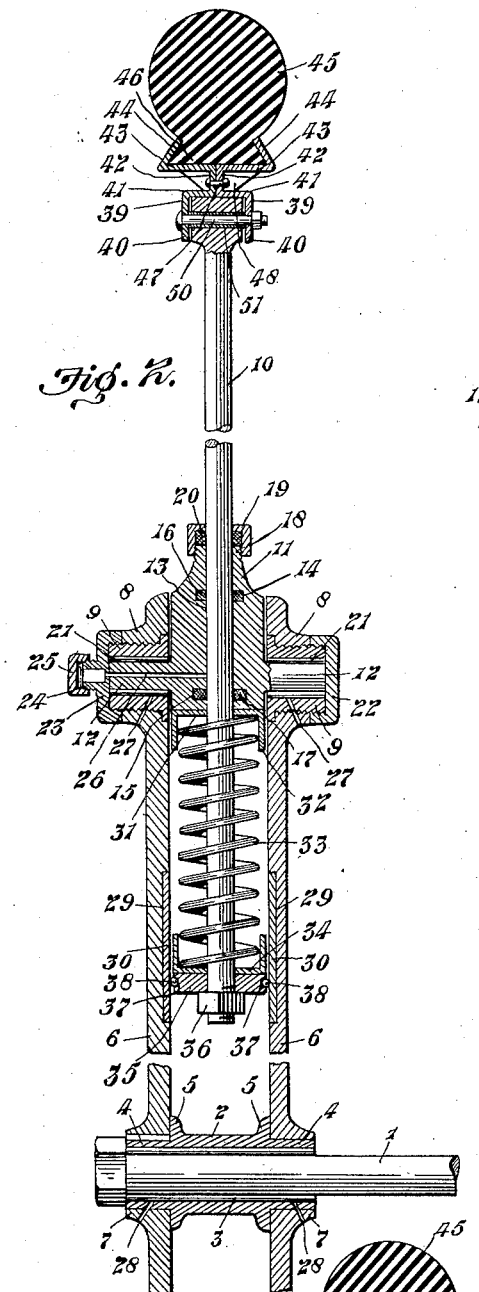
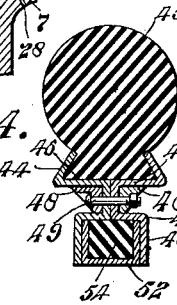
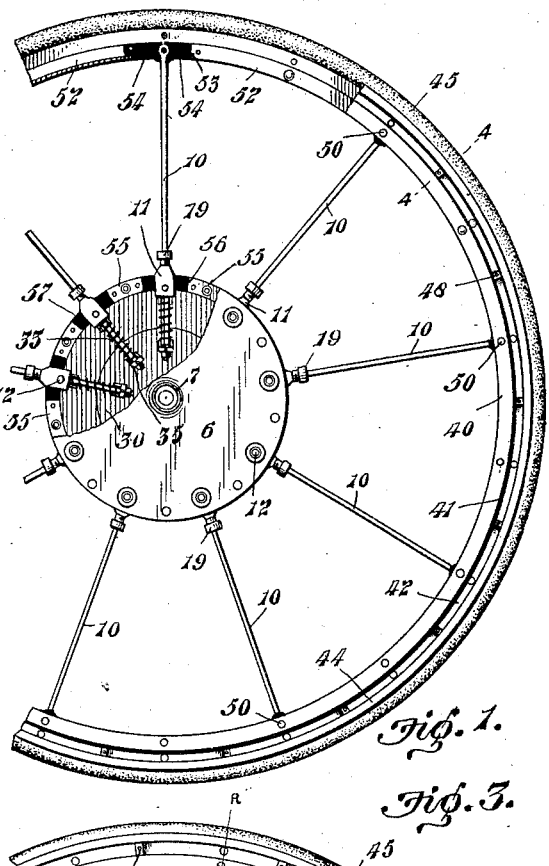
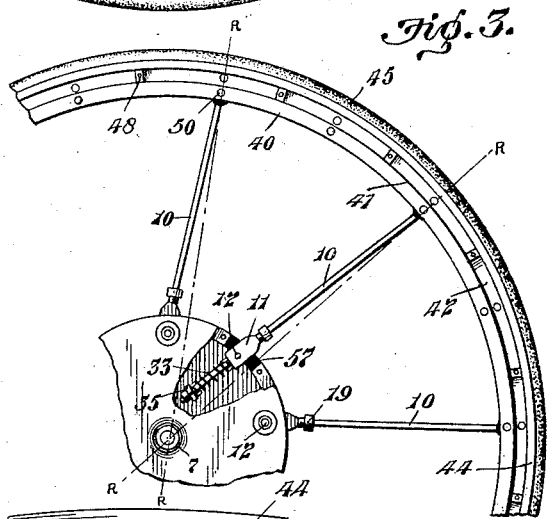

UNITED STATES PATENT OFFICE.

HARMON E. WIREBAUGH, OF CANTON, OHIO.

SPRING-WHEEL.

1,016,534.  Specification of Letters Patent.  Patented Feb. 6, 1912.

Application filed October 24, 1910. Serial No. 588,610.

*To all whom it may concern:*

Be it known that I, HARMON E. WIREBAUGH, a citizen of the United States, residing at Canton, in the county of Stark and State of Ohio, have invented a new and useful Spring-Wheel, of which the following is a specification.

My invention relates to improvements in wheels for vehicles in which springs are used to accomplish the resilient action now commonly accomplished by means of pneumatic tires and the like.

More specifically the invention relates to a form of spring wheel wherein pivotally connected spokes are provided with pivotal and spring attachment to the hub.

The objects of my invention are to generally improve spring wheel construction, to provide a simple, substantial and practical device of the character described which will be strong and durable and not subject to rapid wear, the device being especially well adapted for the traction wheels of automobiles and the like.

These objects, together with other objects readily apparent to those skilled in the art, I attain by the construction illustrated in the accompanying drawings, although my invention may be embodied in other forms, the construction illustrated being chosen by way of example.

In the drawings Figure 1 is a side elevation of a spring wheel embodying my invention, portions of said wheel being broken away. Fig. 2 is an enlarged transverse radial sectional view of the hub, the hub plates, a spoke and its connections with the hub plates and the rim of the wheel, portions being broken away to reduce the size of the figure. Fig. 3 is a fragmentary elevation showing a portion of the wheel in the position assumed under severe tractive strain. Fig. 4 is a transverse sectional view of the felly, rim and tire of the wheel on the line 4—4 of Fig. 1. Fig. 5 is a side elevation of the felly and rim showing one of the rim blocks and its clamping bolt.

Throughout the several views similar reference numerals indicate similar parts.

The numeral 1 indicates the axle of a vehicle, which may be either a live axle or a fixed axle as the case may require.

The numeral 2 indicates a hub mounted upon the axle 1 either fixedly or rotatably, in the latter case the rollers 3 being employed to reduce the friction. The hub 2 is provided with the collar portions 4 at both sides and with the integral hub flanges 5. Each hub plate 6 is provided with a central aperture surrounded by the boss 7, said aperture adapted to receive the collar portion at one end of the hub, the plate being forced along said collar portion until it engages with the hub flange 5, some suitable means being provided for connecting the hub to the hub plate in this position. The hub plates are of a diameter substantially equal to one-third of the diameter of the wheel and are spaced from each other a distance equal to the distance between the hub flanges 5.

Adjacent its circumferential edge each hub plate is provided with an annular series of equi-distant screw threaded spoke attaching apertures, the axes of said apertures lying parallel with the axle 1 and each aperture being surrounded on the outer side of the plate by a strengthening boss 8. Into each screw threaded aperture is screwed an externally screw threaded bushing 9, said bushing extending beyond the limit of the boss 8 for the purpose hereinafter more fully to appear. The spoke attaching apertures in the two hub plates should of course be arranged in alined pairs, the axes of each pair of apertures coinciding.

For the purpose of providing means of attachment between the spokes 10 and the hub plates the spoke blocks 11 are provided. The spokes 10 are preferably round in cross-section. Each spoke block is of a width adapted to snugly fit between the hub plates and is provided with integral, oppositely disposed studs 12, the studs of each block being mounted within the bushings 9 of a pair of spoke attaching apertures, the block 11 thus being permitted to oscillate about an axis parallel to the axle 1.

Through each spoke block extends a round aperture 13, normally radially disposed with reference to the wheel, through which the spoke 10 extends, said spoke being longitudinally slidable in the said aperture. The annular recesses 14 and 15 are arranged on the inside of the spoke block and in connection with the spoke aperture 13, said recesses accommodating felt dust washers 16 and 17 adapted to collect any dust which may settle upon the spoke 10 and work into the aperture 13. In addition to this dust protection the outer end of the block 11 is provided with a rounded screw threaded portion 18, an internally screw threaded cap 19 arranged upon the spoke 10 being adapted to screw onto the portion 18 to hold in place the dust washer 20 which may be readily renewed from time to time by unscrewing the cap 19, as will be readily understood by those skilled in the art.

If desired roller bearings 21 may be provided to reduce the friction as between the studs 12 and the bushings 9. Preferably on the inner side of the wheel, or in other words that side of the wheel toward the body of the vehicle the dust cap 22 is provided, which is adapted to screw onto the projecting end of the bushing 9 to prevent any dust or dirt from entering the adjacent bearing. On the outer side of the wheel a somewhat similar cap 23 is provided, which cap however has an integral reduced screw threaded extension 24 onto which the internally screw threaded grease cup 25 may be screwed. The stud 12 on the same side of the wheel is provided with a grease conducting channel 26 which extends through the stud 12 and the spoke block to the aperture 13, whereby, when cup grease is properly arranged in the grease cup the same may be forced within the spoke block to lubricate the spoke where it slides longitudinally within the aperture 13. If desired oil apertures 27 may be arranged extending through the bosses 8 and bushings 9 to provide convenient means for oiling the studs 12. In a similar way the oil apertures 28 may be arranged in the hub plates 6 and hub 2 for the purpose of oiling the main wheel bearing.

Intermediate the hub 2 and the spoke apertures the plates 6 are provided on their inner sides with annular recesses 29 arranged concentrically with reference to the axle 1 and case hardened annular wear plates 30 are fixedly arranged within said recesses. The purpose of these wear plates will hereinafter more fully appear.

The spokes 10 extend through the spoke blocks 11 for a considerable distance toward the hub 2. On the spoke 10 immediately on the inner side of the spoke blocks 11 are arranged the spring holding cups 31 having inwardly extending annular flanges 32. The coiled, compressible spoke springs 33 are then arranged upon the spokes 10, corresponding spring holding cups 34 with outwardly disposed annular flanges being arranged on the inner ends of the springs, the head blocks 35 being arranged on the spokes 10 next to the cups 34, and nuts 36 on the extreme inner ends of the spokes being adapted to hold the head blocks in place on the spokes. The head blocks are provided, at their sides adjacent the wear plates 30, with ball sockets 37 containing case hardened steel balls 38 adapted to engage the wear plates 30 as the inner ends of the spokes move back and forth as hereinafter more fully explained. The parts should be so constructed that the balls 38 bear upon the plates 30 in such way that there is substantially no side play, while at the same time with as little unnecessary frictional pressure as practical.

The combined felly and rim is formed of two annular metallic rings having the felly portions 39 provided with the inwardly extending spoke attaching flanges 40 and the integral peripheral rim attaching portions 41 extending to the middle of the felly and provided with the outwardly extending mutually connecting abutting flanges 42, from the outer limits of which the main tire supporting rims 43 extend laterally, the integral tire holding flanges 44 extending outwardly and convergently from the outer edges of the rims 43 and forming with said rims a dove-tailed tire holding groove on each wheel, the tire 45 having a corresponding dove-tailed attaching portion 46 engaged by the rims 43 and flanges 44. The tire 45 may be of any desired shape in cross-section and of any suitable material, said tire being preferably composed of solid rubber.

At annularly spaced intervals about the flanges 42 bolts 47 are provided for the purpose of holding said flanges together. At other points annularly about the rims are arranged rim blocks 48 which are of such shape as to fit in between the rim attaching portions 41, flanges 42 and tire supporting rims 43 to constitute strengthening brackets or braces. Such rim blocks are arranged in pairs, a bolt 49 extending through each pair of blocks and through the flanges 42 for the purpose of clamping the said blocks and flanges together. As illustrated in Figs. 2 and 4 said blocks will support the rims 43 against the crushing action of the weight of the load.

At the outer ends of the spokes 10 said spokes have pivotal connection with the felly by means of spoke attaching bolts 50 passing through appropriate apertures in the flanges 40 and through transverse eyes at the outer ends of the spokes. If desired bushings 51 may be arranged in said eyes, whereby any wear, by reason of the oscillation of said spokes upon said bolts may be taken up by replacement of the bolts 50 and bushings 51. It will be of course understood that the bolts 50 should be so arranged as to dispose their axes parallel with the axle 1 and the axes of the studs 12. Intermediate the outer ends of the spokes the felly-filling segments 52, preferably stamped from sheet metal may be arranged between the flanges 40 so as to fill up the otherwise open channel formed by said flanges, to keep out the mud and dust. The segments 52 do not extend to the points of attachment of the spokes 10, however, but terminate at the point 53, the space between the end of each segment and the adjacent spoke being filled by a soft rubber dust excluding packing 54. This packing is forced into place between the flanges 40 with the end of said packing tightly engaging the side of the spoke 10 at the end. One of the packings 54 being arranged upon each side of the spoke, as clearly shown in Fig. 1, dust and mud will be excluded from the pivotal bearing at the end of the spoke.

Between the spaced hub plates 6 intermediate the spoke blocks 11 are arranged spacing blocks 55 of a thickness adapted to hold the plates 6 in proper spaced relation, which blocks 55 do not extend to a point where they will engage the blocks 11, but terminate at the points 56, the spaces between the ends of said blocks and the adjacent spoke blocks being filled by a soft rubber packing 57, which is forced in place and held by any suitable mechanical means between the plates 6 and in close engagement with the blocks 11. It will be understood that this construction will permit the blocks 11 to make considerable oscillating movement while at the same time dust and mud will be excluded from between the hub plates 6, the soft rubber packing 57 closely engaging the blocks 11 at all times by reason of the elastic quality of the rubber composing said packing.

A wheel of the character described having been provided it should be noted that the weight of the load bearing downwardly on the axle and carried by the hub and hub plates will be supported from the upper portion of the felly and rim, said weight resting upon the compressible spoke springs of the upwardly disposed spokes. As the wheel rolls along the ground the weight of the load will thus be transferred in succession from the springs on one set of upwardly disposed spokes to the springs on another set as the various spokes successively come into the upward position. It should also be noted that in the case of traction wheels on automobiles and the like, when the automobile is standing still and the initial torque is given the rear axle and wheels in starting, the spokes will be thrown out of their true radial positions shown in Fig. 3 by the lines R—R into the tangential position illustrated in full lines in said figure. In this position rotary motion will be transmitted to the felly through the spokes 10, not by a movement subjecting the spokes to direct transverse strain, as is usual in wheels now commonly employed, but by means of a tangential pull better adapted to impart rotation without over-straining of the spokes or other portions. When the hub plates are so rotated with reference to the felly as to throw the spokes into tangential position the springs on the various spokes will act together in resisting such movement, and when the wheel has gotten sufficiently under way said springs will act to bring the spokes back substantially into radial position, as will be understood. In going up steep grades, or in other places where there is considerable resistance the spokes will also be thrown into tangential position, the wheel being thus well adapted to relieve the motive power of shock and strain and in fact acting in the nature of an elastic spring connection as between said power and the rims of the wheels.

It should be understood that by reason of the pivotal connection between the spokes and the felly and between the spokes and the hub plates the spokes would be readily thrown into tangential position except for the action of the springs 33. In the assembling of the parts of the wheel said springs should be placed under considerable tension, the strength of the springs and the tension which they normally exert being determined by the weight of the vehicle upon which the wheel is to be used and other practical considerations readily apparent to those skilled in the art.

As the spokes 10 are slidably arranged within the apertures 13 without side play and the steel balls 38 bear against the wear plates 30 there can be no lost side motion as between the spokes 10 and the plate 6 and the head blocks 35 being spaced a considerable distance from the spoke blocks 11 a wheel constructed in accordance with my invention will be capable of standing severe side thrusts without undesirable weakening or collapsing effect. In the practical operation of a wheel such as described it will be found that the springs 33 will produce all of the desirable effects of pneumatic tire construction in so far as resiliency is concerned and in addition will provide spring connection between the motive power and the fellies of the wheels, relieving the parts of undesirable strains as hereinbefore described.

I claim:—

1. A spring wheel comprising a hub, two spaced hub plates concentrically connected to said hub, said plates provided adjacent their circumferential edges with screw threaded spoke attaching apertures, screw threaded bushings arranged in said spoke attaching apertures and having screw threaded projecting portions extending beyond the outer limits of said spoke attaching apertures, spoke blocks arranged intermediate the hub plates, each spoke block provided with oppositely disposed, alined studs mounted in the bushings of oppositely disposed spoke attaching apertures, said blocks being adapted to oscillate with reference to said hub plates, said spoke blocks provided with radially disposed spoke apertures, spokes longitudinally slidably arranged in said spoke apertures, the inner ends of said spokes extending beyond said spoke blocks toward said hub, said spoke blocks also provided with inner annular recesses opening from said spoke apertures, dust washers arranged in said recesses and adapted to slidably engage said spokes, the outer end of each spoke block provided with a cap adjustably connected to said block, a dust washer held in place against the spoke by said cap, dust caps arranged on said screw threaded projecting portions of said bushings, one of said caps for each spoke block provided with a grease cup, the stud of said spoke block provided with a grease conducting channel extending to the spoke aperture in said spoke block and providing communication between said spoke aperture and said grease cup, wear plates concentrically arranged upon the inner sides of said hub plates between said hub and said spoke blocks, a coiled compression spring arranged upon each spoke between its spoke block and its inner end, spring caps arranged on said spoke, each cap having an annular spring retaining flange, head blocks arranged upon the inner ends of said spokes, means for adjusting said head blocks with reference to said spokes, said head blocks provided with cups, steel balls in said cups adapted to engage said wear plates, a felly and rim, and said spokes pivotally connected at their outer ends to said felly.

2. A spring wheel comprising a hub, two spaced hub plates concentrically connected to said hub, spoke blocks arranged intermediate the hub plates, each spoke block provided with oppositely disposed, alined studs journaled in bearings in said hub plates, said spoke blocks provided with radially disposed spoke apertures, spokes longitudinally slidably arranged in said spoke apertures, the inner ends of said spokes extending beyond said spoke apertures toward said hub, said spoke blocks also provided with inner annular recesses opening from said spoke apertures, dust washers arranged in said recesses and adapted to slidably engage said spokes, the outer end of each spoke block provided with a cap adjustably connected to said block, a dust washer held in place against the spoke by said cap, wear plates concentrically arranged upon the inner sides of said hub plates between said hub and said spoke blocks, a coiled compression spring arranged upon each spoke between its spoke block and its inner end, spring caps arranged on said spoke, each cap having an annular spring retaining flange adapted to hold said coiled spring in place upon said spoke and adjustable head blocks on the inner ends of said spokes adapted to be adjusted to increase the tension of said coiled springs, and steel balls held by said head blocks and engaging said wear plates, a felly and rim, and said spokes pivotally connected at their outer ends to said felly.

3. A spring wheel comprising a hub, spaced hub plates concentrically connected to said hub, spoke blocks arranged intermediate the hub plates, each spoke block provided with oppositely disposed, alined studs journaled in bearings in said hub plates, said spoke blocks provided with radially disposed spoke apertures, spokes longitudinally slidably arranged in said spoke apertures, the inner ends of said spokes extending beyond said spoke apertures toward said hub, the outer end of each spoke block provided with a dust washer held in place against the spoke, wear plates concentrically arranged upon the inner sides of said hub plates between said hub and said spoke blocks, a coiled compression spring arranged upon each spoke between its spoke block and its inner end, spring caps arranged on said spoke, each cap having an annular spring-retaining flange adapted to hold said coiled spring in place upon said spoke and adjustable head blocks on the inner ends of said spokes adapted to be adjusted to increase the tension of said coiled springs, and steel balls held by said head blocks and engaging said wear plates, a felly and rim, and said spokes pivotally connected at their outer ends to said felly.

In testimony that I claim the above, I have hereunto subscribed my name in the presence of two witnesses.

HARMON E. WIREBAUGH.

Witnesses:
WILLIAM H. MILLER,
JOHN H. SPONSELLER.

---

Copies of this patent may be obtained for five cents each, by addressing the "Commissioner of Patents, Washington, D. C."